US012807895B2

(12) United States Patent
Hjorth et al.

(10) Patent No.: US 12,807,895 B2
(45) Date of Patent: Nov. 24, 2026

(54) PROCESS FOR PRODUCTION OF A VEGETABLE OIL COMPOSITION HAVING AT LEAST 50% PALMITIC ACID PRESENT IN THE SN2-POSITION OUT OF TOTAL PALMITIC ACID IN THE TRIGLYCERIDES OF THE VEGETABLE OIL COMPOSITION

(71) Applicant: AAK AB (PUBL), Malmö (SE)

(72) Inventors: Jeppe Lindegaard Hjorth, Aarhus N (DK); Anne Brinkø, Viby J (DK)

(73) Assignee: AAK AB (PUBL), Malmö (SE)

( * ) Notice: Subject to any disclaimer, the term of this patent is extended or adjusted under 35 U.S.C. 154(b) by 531 days.

(21) Appl. No.: 18/042,471

(22) PCT Filed: Aug. 26, 2021

(86) PCT No.: PCT/SE2021/050829
§ 371 (c)(1),
(2) Date: Feb. 22, 2023

(87) PCT Pub. No.: WO2022/045953
PCT Pub. Date: Mar. 3, 2022

(65) Prior Publication Data

US 2023/0323243 A1 Oct. 12, 2023

(30) Foreign Application Priority Data

Aug. 31, 2020 (SE) .................................... 2051009-5

(51) Int. Cl.
*C11B 3/00* (2006.01)
*A23D 9/04* (2006.01)
(Continued)

(52) U.S. Cl.
CPC ................ *C11B 3/003* (2013.01); *A23D 9/04* (2013.01); *A23L 33/115* (2016.08); *A23L 33/40* (2016.08);
(Continued)

(58) Field of Classification Search
CPC .......... C11B 3/003; C11B 3/12; A23L 33/115; A23L 33/40; A23D 9/04; C11C 1/045; C11C 1/10; C11C 3/02
(Continued)

(56) References Cited

U.S. PATENT DOCUMENTS

| | | | |
|---|---|---|---|
| 5,658,768 | A | 8/1997 | Quinlan |
| 2007/0218169 | A1 | 9/2007 | Meiri-Bendek et al. |

(Continued)

FOREIGN PATENT DOCUMENTS

| | | | |
|---|---|---|---|
| CN | 1874822 | A | 12/2006 |
| CN | 102757988 | A | 10/2012 |

(Continued)

OTHER PUBLICATIONS

Translation of CN-108265089-A (Year: 2018).*
(Continued)

*Primary Examiner* — Brent T O'Hern
(74) *Attorney, Agent, or Firm* — Finnegan, Henderson, Farabow, Garrett & Dunner, LLP

(57) ABSTRACT

Disclosed is a process for production of a final vegetable oil composition having at least 50% palmitic acid present in the sn2-position out of total palmitic acid in the triglycerides of the final vegetable oil composition, wherein the process comprises a step of providing a starting vegetable oil composition comprising palmitic acid in the triglycerides, a step of performing an enzymatic transesterification process, and a step of using excess free fatty acids and/or non-glyceride esters thereof obtained during the process and recycling them back into the process; wherein at least 70% by weight out of the total amount of palmitic acid in the starting vegetable oil composition is present in the final vegetable oil composition. A vegetable oil composition obtained by the disclosed process, use of said vegetable oil composition in
(Continued)

the manufacture of an infant formula, and an infant formula comprising the vegetable oil composition is further disclosed.

23 Claims, 3 Drawing Sheets

(51) Int. Cl.

| | |
|---|---|
| ***A23L 33/00*** | (2016.01) |
| ***A23L 33/115*** | (2016.01) |
| ***C11B 3/12*** | (2006.01) |
| ***C11C 1/04*** | (2006.01) |
| ***C11C 1/10*** | (2006.01) |
| ***C11C 3/02*** | (2006.01) |

(52) U.S. Cl.
CPC ................ *C11B 3/12* (2013.01); *C11C 1/045* (2013.01); *C11C 1/10* (2013.01); *C11C 3/02* (2013.01)

(58) Field of Classification Search
USPC ........................................................... 426/33
See application file for complete search history.

(56) References Cited

U.S. PATENT DOCUMENTS

| | | | | |
|---|---|---|---|---|
| 2019/0048370 A1 * | 2/2019 | Watanabe | ...... | C12Y 301/01003 |
| 2021/0002681 A1 | 1/2021 | Watanabe | | |

FOREIGN PATENT DOCUMENTS

| | | | | | | |
|---|---|---|---|---|---|---|
| CN | 102776077 | A | | 11/2012 | | |
| CN | 104561145 | A | * | 4/2015 | | |
| CN | 106916631 | A | | 7/2017 | | |
| CN | 107581615 | A | | 1/2018 | | |
| CN | 108265089 | A | * | 7/2018 | ............... | C11C 3/10 |
| CN | 109082447 | A | | 12/2018 | | |
| CN | 109984212 | A | | 7/2019 | | |
| EP | 0 209 327 | A2 | | 1/1987 | | |
| EP | 0209327 | B1 | | 9/1990 | | |
| EP | 0 965 578 | A1 | | 12/1999 | | |
| EP | 1 644 469 | A1 | | 4/2006 | | |
| EP | 1 928 990 | | | 6/2008 | | |
| EP | 1928990 | B1 | | 2/2017 | | |
| EP | 3027063 | B1 | * | 11/2018 | ............ | A23L 33/12 |
| EP | 3 583 857 | A1 | | 12/2019 | | |
| JP | 62-25936 | A | | 2/1987 | | |
| JP | H06-070786 | A | | 3/1994 | | |
| JP | H08-509620 | A | | 10/1996 | | |
| JP | 2000-008074 | A | | 1/2000 | | |
| JP | 2009-507480 | A | | 2/2009 | | |
| JP | 2019-183169 | A | | 10/2019 | | |
| JP | 2019-214740 | A | | 12/2019 | | |
| WO | WO 2005/036987 | A1 | | 4/2005 | | |
| WO | 2007/029018 | A1 | | 3/2007 | | |
| WO | WO 2016/101894 | A1 | | 6/2016 | | |

OTHER PUBLICATIONS

Cowan, Enzymatic Interesterification, AOCS (Year: 2019).*
Wang, 1,3-Dioleoyl-2-palmitoylglycerol-rich triacylglycerol characterization by three processing methods (2019), International Journal of Food Properties 2019, vol. 22, No. 1, 1156-1171 (Year: 2019).*
Translation of Deng et al. (CN 104561145) (Year: 2018).*
Wang et al., "1,3-Dioleoyl-2-palmitoylglycerol-rich triacylglycerol characterization by three processing methods," International Journal of Food Properties, 22(1):1156-1171 (2019).
Chen et al., "Synthesis of the Structured Lipid 1,3-Dioleoyl-2-palmitoylglycerol from Palm Oil," JAOCS, 81(6) (2004).
International Search Report for PCT/SE2021/050829, mailed Oct. 20, 2021, 8 pages.
Written Opinion of the International Search Authority for PCT/SE2021/050829, mailed Oct. 20, 2021, 9 pages.

* cited by examiner

PROCESS FOR PRODUCTION OF A VEGETABLE OIL COMPOSITION HAVING AT LEAST 50% PALMITIC ACID PRESENT IN THE SN2-POSITION OUT OF TOTAL PALMITIC ACID IN THE TRIGLYCERIDES OF THE VEGETABLE OIL COMPOSITION

The present application is a national stage entry of PCT/SE2021/050829, filed Aug. 26, 2021, which claims priority to Swedish Application No. 2051009-5, filed Aug. 31, 2020. The entire contents of each application are hereby incorporated by reference.

TECHNICAL FIELD OF THE INVENTION

The present invention relates to a process for production of a final vegetable oil composition having at least 50% palmitic acid present in the sn2-position out of total palmitic acid in the triglycerides of the final vegetable oil composition. The invention further relates to a vegetable oil composition having at least 50% palmitic acid present in the sn2-position out of total palmitic acid in the triglycerides of the vegetable oil composition obtained by the process disclosed herein, use of the vegetable oil composition having at least 50% palmitic acid present in the sn2-position out of total palmitic acid in the triglycerides of the vegetable oil composition, and an infant formula comprising the vegetable oil composition having at least 50% palmitic acid present in the sn2-position out of total palmitic acid in the triglycerides of the vegetable oil composition as disclosed herein.

BACKGROUND OF THE INVENTION

The "traditional" way of making products having a high amount of palmitic acid (P) in the sn2-position, such as OPO (O being oleic acid), is to use some kind of highly fractionated palm stearin as disclosed in e.g. EP1928990 B1, EP3583857 A1, EP0209327B1 and WO2005/036987. The advantage of using a hard palm stearin is that this is a way to ensure a high content of palmitic acid in the starting oil. This will in turn ensure a higher content of palmitic acid in the sn2-position which is important in order to achieve an OPO product of higher purity in an enzymatic transesterification. The downside to this is that the hard palm stearin used as starting material must undergo several processing steps to achieve the desired iodine value (IV) and palmitic acid in the sn2-position. This not only makes it a labour-intensive and expensive starting material; it is also a problem if it is desirable to use a less abundant raw material like an organic palm oil. If a scarce raw material like organic palm oil is used, it is desirable to utilize as much of the palmitic acid in the starting material as possible. When fractionating a hard palm stearin, the desired triglyceride is PPP. This means that all the triglycerides present as POP and POO will be undesired and are thus removed to a large extent. All the palmitic acid present in these triglycerides are then lost thus resulting in a less than optimal utilization of the palmitic acid in the starting material.

Accordingly, the main object of the invention is to provide an efficient and alternative way of producing a vegetable oil composition having a high amount of palmitic acid present in the sn2-position.

Another object of the invention is to provide a way of utilizing as much of the palmitic acid in the starting material as possible.

SUMMARY OF THE INVENTION

The present invention relates to a process for production of a final vegetable oil composition having at least 50% palmitic acid present in the sn2-position out of total palmitic acid in the triglycerides of the final vegetable oil composition, wherein said process comprises a step of providing a starting vegetable oil composition comprising palmitic acid in the triglycerides, a step of performing an enzymatic transesterification process, and a step of using excess free fatty acids and/or non-glyceride esters thereof obtained during the process and recycling them back into the process; wherein at least 70% by weight out of the total amount of palmitic acid in the starting vegetable oil composition is present in the final vegetable oil composition.

By the present process it is possible to obtain a vegetable oil composition having a high amount of palmitic acid present in the sn2-position out of total palmitic acid in the triglycerides of the vegetable oil composition.

The process efficiently utilizes the palmitic acid in the starting oil composition which is an advantage, especially in the case where the starting oil composition is of a limited supply, e.g. an organic palm oil. The present process hereby takes the limited supply and price into account. In the process, at least 70% by weight out of the total amount of palmitic acid in the starting vegetable oil composition is present in the final vegetable oil composition.

The present invention also relates to a vegetable oil composition having at least 50% palmitic acid present in the sn2-position out of total palmitic acid in the triglycerides of the vegetable oil composition, obtained by the process according to the present invention.

The present invention further relates to use of the vegetable oil composition having at least 50% palmitic acid present in the sn2-position out of total palmitic acid in the triglycerides of the vegetable oil composition according to the present invention in the manufacture of an infant formula or a plant based food product. A plant based food product is intended to mean a food product based mainly on components of vegetable origin. Minor components of non-vegetable origin is allowed to be present. In one embodiment the plant based food product is made entirely of components having vegetable origin and thus comprises no components of animal origin. An example of a plant based food product is milk free infant food products.

The present invention also comprises an infant formula comprising from 15% to 100% by weight of a vegetable oil composition having at least 50% palmitic acid present in the sn2-position out of total palmitic acid in the triglycerides of the vegetable oil composition according to the present invention.

DEFINITIONS

Figure 1:
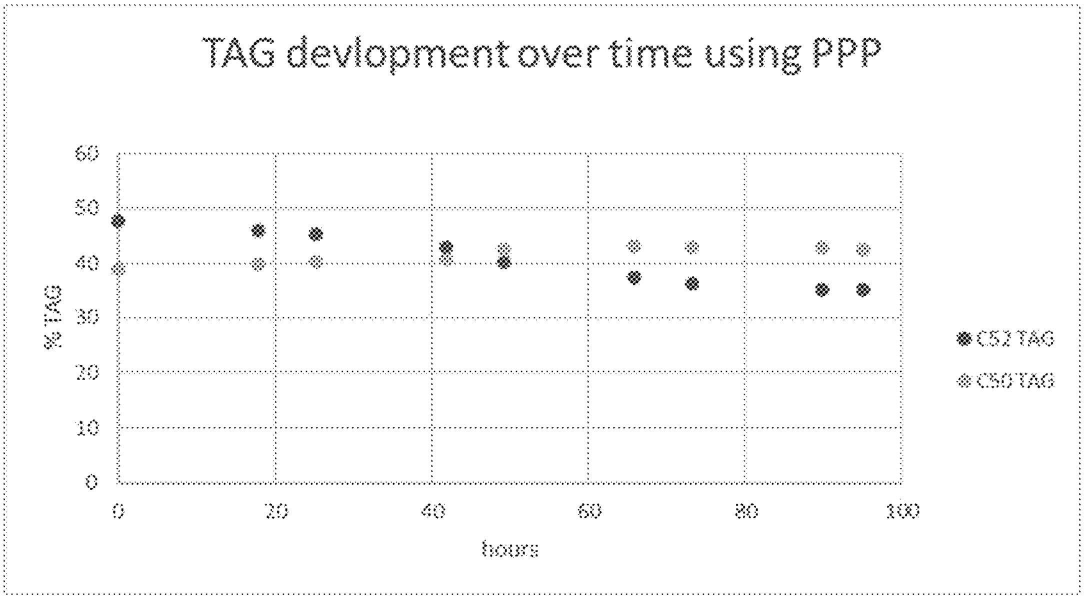
FIG. 1 shows TAG development over time using PPP as in example 2.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

As used herein, the term "vegetable" shall be understood as originating from a plant or a single cell organism. Thus, vegetable oil or vegetable triglycerides are still to be understood as vegetable oil or vegetable triglycerides if all the fatty acids used to obtain said triglyceride or oil is of plant or single cell organism origin.

Saturated fatty acids are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. An unsaturated fatty acid can exist in two forms, the cis form and the trans form. A double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond.

By using the nomenclature CX means that the fatty acid comprises X carbon atoms, e.g. a C14 fatty acid has 14 carbon atoms while a C8 fatty acid has 8 carbon atoms.

By using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

As used herein, "C18" covers C18:0, which is stearic acid (St), C18:1, which is oleic acid (O), C18:2, which is linoleic acid (Li, or L), and C18:3, which is linolenic acid (Ln). Hence, "a fatty acid composition rich in C18-fatty acids and/or non-glyceride esters thereof" and "a C18-fatty acid rich fraction", also covers one or more of stearic acid, oleic acid, linoleic acid, and linolenic acid.

By palmitic acid (C16:0) rich fraction is meant that at least 85% by weight of the fraction is palmitic acid.

By C18 rich fraction is meant that at least 70% by weight of the fraction is C18.

By fractional distillation is meant separating fatty acids based on their boiling points. For a detailed description of fractional distillation is referred to: Steven C. Cermak, Roque L. Evangelista and James A. Kenar (2012). Distillation of Natural Fatty Acids and Their Chemical Derivatives, Distillation—Advances from modelling to Applications, Dr. Sina Zereshki (Ed.), ISBN: 978-953-51-0428-5.

As used herein, "%" or "percentage" relates to weight percentage i.e. wt % or wt.-% if nothing else is indicated.

As used herein, "oil" and "fat" are used interchangeably, unless otherwise specified.

As used herein, "vegetable oil" and "vegetable fat" are used interchangeably, unless otherwise specified.

As used herein the term "single cell oil" shall mean oil from oleaginous microorganisms, which are species of yeasts, molds (fungal), bacteria, and microalgae. These single cell oils are produced intracellular and in most cases during the stationary growth phase under specific growth conditions (e.g. under nitrogen limitation with simultaneous excess of a carbon source). Examples of oleaginous microorganisms are, but not limited to, Mortierella alpineea, Yarrowia lipolytica, Schizochytrium, Nannochloropsis, Chlorella, Crypthecodinium cohnii, and Shewanella.

A food product is a product for human consumption.

A plant based food product is intended to mean a food product based mainly on components of vegetable origin. Minor components of non-vegetable origin is allowed to be present. In one embodiment the plant based food product is made entirely of components having vegetable origin and thus comprises no components of animal origin. An example of a plant based food product is milk free infant food products.

As used herein triglyceride compositions, oils, or fats denotes the same thing, and it is to be understood that other acylglycerols such as mono- and diglyceride can be present but the majority of said compositions are triglycerides.

The term "comprising", "to comprise" or "contains" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

DETAILED DESCRIPTION OF THE INVENTION

The description herein of any aspect or embodiment of the invention using terms such as "comprising", "having", "including", or "containing" with reference to an element or elements is intended to provide support for a similar aspect or embodiment of the invention that "consists of", "consists essentially of", or "substantially comprises" that particular element or elements, unless otherwise stated or clearly contradicted by context, e.g. a composition described herein as comprising a particular element should be understood as also describing a composition consisting of that element, unless otherwise stated or clearly contradicted by context. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The present invention relates to a process for production of a final vegetable oil composition having at least 50% palmitic acid present in the sn2-position out of total palmitic acid in the triglycerides of the final vegetable oil composition, wherein said process comprises a step of providing a starting vegetable oil composition comprising palmitic acid in the triglycerides, a step of performing an enzymatic transesterification process, and a step of using excess free fatty acids and/or non-glyceride esters thereof obtained during the process and recycling them back into the process; wherein at least 70% by weight out of the total amount of palmitic acid in the starting vegetable oil composition is present in the final vegetable oil composition.

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and that below becomes C-3. The prefix ‘sn’ is placed before the stem name of the compound.

Sn1/sn2/sn3:

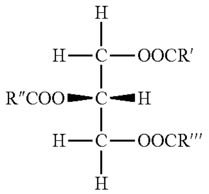

position sn-1
position sn-2
position sn-3

Fischer projection of a natural L-glycerol derivative.

The present process results in an increased sn2-position palmitic acid compared to a starting vegetable oil composition which means that the content of palmitic acid in the triglycerides in the sn2-position (the mid position on the triglyceride) of the final vegetable oil composition is increased if compared to the content of palmitic acid in the same position in the starting vegetable oil composition.

In one or more embodiments, the process can be run several times (e.g. 4, 5, 6, 7, or 8 cycles) so that the excess free fatty acids and/or non-glyceride esters thereof obtained during the process can be recycled back into the process several times, that is; the excess free fatty acids and/or non-glyceride esters thereof obtained in a preceding run is used in a present run hereby obtaining a new excess free fatty acids and/or non-glyceride esters thereof for use in a subsequent run and so forth.

By using excess free fatty acids and/or non-glyceride esters thereof obtained during the process and recycling them back into the process, at least the unreacted palmitic acid left from one process cycle can be reused in the same process starting from a new amount of starting vegetable oil composition. This means that the palmitic acid rich fraction obtained in a preceding run is used in a present run, hereby obtaining a new palmitic acid rich fraction for use in a subsequent run and so forth. Hence, as the palmitic acid is found as a limiting source in nature, the present process secures that the amount of palmitic acid wasted during the process is minimal, as it keeps reusing the excess palmitic acid into the process.

In one or more embodiments, the fatty acid non-glyceride esters are selected from methyl esters, ethyl esters, or combinations hereof.

In one or more embodiments, the process further comprises the steps of:

I. performing a hydrolysis or alcoholysis process and further a distillation thereby obtaining at least a palmitic acid rich fraction;
II. performing an esterification of glycerol with said palmitic acid rich fraction to obtain at least a vegetable oil rich in PPP TAGs;
III. subjecting said vegetable oil rich in PPP TAGs to the enzymatic transesterification process with a fatty acid composition, thereby obtaining a crude vegetable oil blend;
IV. separating the crude vegetable oil blend to obtain a mixture of excess free fatty acids and/or non-glyceride esters thereof and the final vegetable oil composition having palmitic acid present in the sn2-position;
V. using the mixture of excess free fatty acids and/or non-glyceride esters thereof obtained during the process and recycling them back into the process.

In one or more embodiments, the fatty acid composition of step III is a fatty acid composition rich in C18-fatty acids and/or non-glyceride esters thereof.

In one or more embodiments, step I comprises the following steps:

Ia. subjecting said starting vegetable oil composition to a hydrolysis or alcoholysis process obtaining glycerol and free fatty acids and/or non-glyceride esters thereof;
Ib. separating said free fatty acids and/or non-glyceride esters thereof from said glycerol and water/alcohol obtaining a mixture of free fatty acid and/or non-glyceride esters thereof;
Ic. performing a distillation process on said mixture of free fatty acid and/or non-glyceride esters thereof to obtain a C18-fatty acid rich fraction and a palmitic acid rich fraction.

By glycerol and water/alcohol is meant either glycerol and water, when a hydrolysis process is conducted in step Ia, or glycerol and alcohol, when a alcoholysis process is conducted in step Ia.

In one or more embodiments, the hydrolysis in step Ia may take place at high pressure and high temperature in a counter-current reaction tower. The oils are fed near the bottom of the tower, and the water is fed near the top of the tower. Due to difference in density, the water will be transported downwards through the tower and the oil will strive upwards. During the contact of water phase and oil phase hydrolysis will take place and fatty acid and glycerol will be formed. Glycerol is leaving the tower, together with surplus water, at the bottom and the fatty acid is leaving the tower at the top. The glycerol may be re-used in the process once water has been removed. After the hydrolysis step the hydrolysed fatty acids can be purified by distillation.

In one or more embodiments, the esterification in step II comprises the steps of:

a) blending the glycerol with said palmitic acid rich fraction to obtain a blend;
b) heating said blend under reduced pressure over a predefined period of time;
c) further increasing the temperature and heating said blend over a predefined period of time and simultaneously lowering the pressure further compared to step b.
d) keeping said blend at the temperature and pressure of step c) for a predefined period of time.

In one or more embodiments of the esterification in step II, step b) and step c) are combined into one step by continuously heating the glycerol and fatty acid mixture blend to the wanted temperature under reduced pressure over a predefined time.

In one or more embodiments of the esterification in step II, step c) comprises two steps; c1) lowering the pressure compared to step b) over a predefined period of time; c2) increasing the temperature under the reduced pressure of step c1) over a predefined period of time.

In one or more embodiments of the esterification in step II, step c1) and step c2) are sequentially in that order.

In one or more embodiments of the esterification in step II, step c1) and step c2) are reversed.

In one or more embodiments of the esterification in step II, the glycerol and the palmitic acid rich fraction of step a) is mixed at a ratio of 1:3.125 or up to 1:10 (mol glycerol:mol free fatty acid and/or non-glyceride esters thereof) to obtain the blend.

In one or embodiments of the esterification in step II, the step of blending the glycerol with said palmitic acid rich fraction to obtain a blend (step a) is carried out in a container. A container may be any container suitable for carrying out a chemical reaction. Such containers may e.g. be, but not limited to, a flask, a tank, a tube, a laboratory flask, a round-bottom flask, a three-necked flask, a two-necked flask, a one-necked flask, a glass flask, or a metal flask. The reaction may be carried out with or without agitation, such as stirring.

In one or more embodiments of the esterification in step II, a condenser is used. The condenser is heated to a temperature of 40° C. to 150° C., such as 50° C. to 90° C., or such as 65° C. to 90° C. This temperature of the condenser is dependent on the size and surface area of the condenser and it is important to use a temperature where water is evaporated while the majority of the glycerol is condensed, to avoid losing too much of the glycerol. A person skilled in the art would know how to adjust this.

In one or more embodiments, of the esterification in step II, the blend is heated to a temperature in the range of 140° C. to 180° C. in step b). In one or more embodiment of the process, the blend is heated to a temperature in the range of 160° C. to 170° C. in step b).

In one or more embodiments of the esterification in step II, the reduced pressure in step b) is in the range of 150 mbar to 400 mbar, such as in the range of 175 mbar to 250 mbar.

In one or more embodiments of the esterification in step II, the predefined period of time in step b) is in the range of 15 minutes to 5 hours, such as in the range of 30 minutes to 4 hours.

In one or more embodiments of the esterification in step II, the predefined period of time in step b) is at least 15 minutes, such as at least 20 minutes, such as at least 30 minutes, such as at least 1 hour, such as at least 2 hours, such as at least 3 hours.

In one or more embodiments of the esterification in step II, the temperature in step c) is in the range of 180° C. to 250° C., such as in the range of 210° C. to 230° C.

In one or more embodiments of the esterification in step II, the blend in step c) is heated to at least 160° C.

In one or more embodiments of the esterification in step II, the blend in step c) is heated to maximum 230° C. In one or more embodiments, the blend in step c) is heated to maximum 240° C.

The temperature is gradually raised when going from step b) to step c). In one or more embodiments, the temperature is raised from around 170° C. in step b) and up to around 210° C. in step c).

In one or more embodiments of the esterification in step II, the pressure in step c) is in the range of 10 mbar to 400 mbar, such as in the range of 20 mbar to 250 mbar, such as in the range of 30 mbar to 150 mbar, such as in the range of 30 mbar to 90 mbar, or such as in the range of 30 mbar to 40 mbar.

The pressure is gradually decreased when going from step b) to step c). In one or more embodiments, the pressure is decreased from around 200 mbar in step b) and down to around 30 mbar in step c).

In one or more embodiments of the esterification in step II, the predefined period of time in step c) is in the range of 15 minutes to 5 hours, such as in the range of 30 minutes to 4 hours.

In one or more embodiments of the esterification in step II, the predefined period of time in step c) is at least 15 minutes, such as at least 20 minutes, such as at least 30 minutes, such as at least 1 hour, or such as at least 2 hours.

In one or more embodiments of the esterification in step II, a catalyst is added in step a). The catalyst can be any catalyst known to be beneficial in an esterification process. In one or more embodiment, the catalyst is an organic catalyst. In one or more embodiments, zinc oxide is used as a catalyst. Hence, in one or more embodiments of the present process, zinc oxide (ZnO) is added in step a) as a catalyst. As it is known to the person skilled in the art, the predefined amount of time in step d) will decrease if a catalyst is used.

In one or more embodiments, step III comprises the following steps:

IIIa. performing a distillation and/or neutralization process on the resulting vegetable oil rich in PPP TAGs of step II to remove the excess free fatty acids and/or non-glyceride esters thereof; thereby obtaining a vegetable oil composition having 63% to 97% by weight of total triglycerides being tri-palmitic TAGs;

IIIb. mixing the obtained vegetable oil composition having 63% to 97% by weight of total triglycerides being tri-palmitic TAGs with a fatty acid composition rich in C18-fatty acids and/or non-glyceride esters thereof to obtain a first mixture;

IIIc. performing an enzymatic transesterification process by use of one or more 1,3-specific enzymes to said first mixture from step IIIb thereby obtaining a crude vegetable oil blend.

In one or more embodiments, the distillation in step IIIa) is a physical refinement. In one or more embodiments, the distillation takes place at a temperature of at least 160° C., and optionally under reduced pressure. In one or more embodiments, the distillation takes place at a temperature of at least 190° C. and under reduced pressure. In one or more embodiments, the distillation takes place at a temperature of between 220° C. and 260° C. and under reduced pressure, such as around 240° C. and under reduced pressure. This is standard conditions for a distillation process as known by the person skilled in the art. In one embodiment, chemical refinement can be used instead of physical refinement and the skilled person will then know to change the temperature to around 100° C.

In one or more embodiments the one or more 1,3-specific enzymes can be a 1,3-specific lipase (i.e. sn1 and sn3 position specific lipase). This will decrease the content of palmitic acid in the outer positions of the triglycerides and consequently increasing the proportion of palmitic acid in the sn2-position in relation to the total content of palmitic acid in the triglycerides.

In one or more embodiments, the step of using excess free fatty acids and/or non-glyceride esters thereof obtained during the process and recycling them back into the process comprises using the mixture of excess free fatty acids and/or non-glyceride esters thereof obtained from step IV and providing them to the mixture of step Ic.

In one or more embodiments, the process further comprises splitting the mixture of excess free fatty acids and/or non-glyceride esters thereof from step IV by a distillation process, thereby obtaining a palmitic acid (P, C16:0) rich fraction and a C18-fatty acid rich fraction and using at least a part of the palmitic acid rich fraction in step II.

By recovering and splitting the mixture of excess free fatty acids and/or non-glyceride esters thereof by a distillation process, thereby obtaining a palmitic acid (P, C16:0) rich fraction and a C18-fatty acid rich fraction at least the unreacted palmitic acid left from the process can be reused in the process starting from a new amount of starting vegetable oil composition. By this, the palmitic acid rich fraction obtained in a preceding run is used in a present run, hereby obtaining a new palmitic acid rich fraction for use in a subsequent run and so forth. This means that as palmitic acid is found as a limiting source in nature, the present process secures that the amount of palmitic acid wasted during the process is minimal, as it keeps reusing the excess palmitic acid back into the process.

In one or more embodiments, the process further comprises a distillation process of the C18-fatty acid rich fraction and using at least a part of the C18-fatty acid rich fraction in step IIIb.

In one or more embodiments, the C18-fatty acid rich fraction from step Ic is used in step IIIb. Hence, in one or more embodiments there is no unused fractions since the obtained factions are all re-used in the process.

When splitting the starting vegetable oil composition, the palmitic acid will be the main product, but the resulting C18 fatty acids and glycerol can in one or more embodiments also be purified and fed back into the process, thereby creating an effective process from a raw material perspective and at the same time maintain the origin of the starting oil composition.

In one or more embodiments, the process further comprises a step of separating glycerol and water/alcohol from step Ib and using the obtained glycerol of said step in the esterification step II.

In one or more embodiments, the process further comprises a step of using the excess free fatty acids and/or non-glyceride esters thereof obtained from step IIIa and further providing them to the esterification step II.

In one or more embodiments, the process further comprises bleaching and/or neutralization of the resulting product of the distillation and/or neutralization process of step Ilia.

In one or more embodiments, the process further comprises bleaching and/or neutralization and/or deodorization of the resulting final vegetable oil composition of the separation of step IV.

In one or more embodiments, the vegetable oil composition obtained after step IIIa is having 70% to 97% by weight of total triglycerides being tri-palmitic TAGs, such as 85% to 97% by weight of total triglycerides being tri-palmitic TAGs.

In one or more embodiments, the proportion of palmitic acid in sn2-position in the triglycerides of the vegetable oil composition obtained after step IIIa is in the range of 85% to 99%.

In one or more embodiments, the vegetable oil composition obtained after step IIIa has an amount of diglycerides and/or monoglycerides of no more than 6%, such as no more than 3%, or such as no more than 2% compared to the total weight of the vegetable oil composition. In one or more embodiments, the vegetable oil composition obtained after step IIIa has an amount of diglycerides and/or monoglycerides in the range of 0% to 6% compared to the total weight of the vegetable oil composition, such as in the range of 0.5% to 5%, such as in the range of 0.5% to 4%, such as in the range of 0.5% to 3%, such as in the range of 0.5% to 3%, or such as in the range of 0.5% to 2% compared to the total weight of the vegetable oil composition.

In one or more embodiments, the proportion of palmitic acid in sn2-position out of total palmitic acid in the triglycerides of the final vegetable oil composition is 52% or more, such as 55% or more, such as 60% or more, or such as 70% or more. In one or more embodiments, the proportion of palmitic acid in sn2-position out of total palmitic acid in the triglycerides of the final vegetable oil composition is in the range of 52% to 80%, such as in the range of 52% to 75%, such as in the range of 52% to 70%, or such as in the range of 55% to 70%.

In one or more embodiments, the final vegetable oil composition comprises between 30% and 60% by weight of palmitic acid in the triglycerides compared to the total weight of fatty acids in the triglycerides in the final vegetable oil composition, such as between 30% and 50%, such as between 35% and 45%, or such as between 40% and 45%. In one or more embodiments, the final vegetable oil composition comprises at least 30% by weight of palmitic acid in the triglycerides compared to the total weight of fatty acids in the triglycerides in the final vegetable oil composition, such as at least 35%, or such as at least 40%.

In one or more embodiments, the ratio of oleic acid to linoleic acid (oleic acid:linoleic acid) in the triglycerides of the final vegetable oil composition is in the range of 10:1 to 1:2, such as in the range of 5:1 to 1:1.

In one or more embodiments, 40% or more of the triglycerides in the final vegetable oil composition is of the type OPO, OPL, and/or LPL.

In one or more embodiments, 40% or more of the triglycerides in the final vegetable oil composition is of the type OPO.

In one or more embodiments, at least 75% by weight out of the total amount of palmitic acid in the starting vegetable oil composition is present in the final vegetable oil composition, such as at least 80%, such as at least 90%, or such as at least 95% by weight out of the total amount of palmitic acid in the starting vegetable oil composition is present in the final vegetable oil composition.

In one or more embodiments, no chemical catalyst is used in any of the process steps. By avoiding using a chemical catalyst the process is simpler, and if an organic starting vegetable oil composition is used the final vegetable oil composition can keep its organic status.

In one or more embodiments, any enzyme used is a non-genetically modified enzyme. A non-genetically modified enzyme is an enzyme which is produced without using genetically modified organism (GMO) techniques.

In one or more embodiments, no organic solvents are used in any of the process steps.

A process not using a chemical catalyst and a non-GMO produced enzyme (such as a lipase) and further where no organic solvent is used in any of the step should help the final vegetable oil composition to be produced under the organic rules and regulations hereby organically certify the final product if also starting from an organically certified starting oil composition.

In one or more embodiments, the starting vegetable oil composition comprises 80% or less by weight of palmitic acid in the triglycerides compared to the total weight of fatty acids in the triglycerides.

In one or more embodiments, the starting vegetable oil composition comprises at least 9% palmitic acid in the triglycerides compared to the total weight of fatty acids in the triglycerides, such as at least 15%, such as at least 25%, such as at least 35%, such as at least 40%, such as at least 50%, or such as at least 60% palmitic acid.

In one or more embodiments, the starting vegetable oil composition comprises in the range of 9% to 80% palmitic acid in the triglycerides compared to the total weight of fatty acids in the triglycerides, such as in the range of 15% to 80%, such as in the range of 20% to 80%, such as in the range of 30% to 80%, such as in the range of 30% to 75%, or such as in the range of 30% to 70%.

In one or more embodiments, the starting vegetable oil composition has an iodine value of at least 15, such as at least 20, such as at least 25, such as at least 30, such as at least 35, such as at least 40, such as at least 45, such as at least 50, such as at least 55, or such as at least 60.

In one or more embodiments, the starting vegetable oil composition has an iodine value of at least 70, such as at least 80, such as at least 90, such as at least 100, such as at least 110, such as at least 120, or such as at least 130.

In one or more embodiments, the starting vegetable oil composition has an iodine value of 140 or less, such as 130 or less, such as 120 or less, or such as 110 or less.

In one or more embodiments, the starting vegetable oil composition has an iodine value of 100 or less, such as 90 or less, such as 80 or less, or such as 70 or less.

In one or more embodiments, the starting vegetable oil composition has an iodine value in the range of 15 to 140, such as in the range of 30 to 70, or such as in the range of 30 to 55.

Being able to start with a starting oil, having less content of palmitic acid than in a palm stearin with low iodine value of e.g. 12, is highly beneficial, since palmitic acid is a rare source material to obtain, especially if you need an organic variant. Thereby a more economic process can be obtained. Previous teachings has shown that in order to create a vegetable fat with a high content of palmitic acid in sn2-position the starting material for a process should be selected from an as hard as possible palm stearin (e.g. a palm stearin with low iodine value (<12)), as this equals to more palmitic acid in the starting composition, especially more sn2 palmitic acid. Contrary to this, the present invention is able to start from other starting materials, e.g. palm fractions with a higher iodine value, and still create a balanced process to create a vegetable oil composition with a high content of palmitic acid in the sn2-position.

In one embodiment, the process as disclosed herein starts with a palm fraction having an iodine value of at least 15 as the starting oil. The palm fraction is then converted into a very pure vegetable oil rich in PPP TAGs.

Hence, the present process is a more efficient process that makes it possible to use cheaper, less processed starting materials while still achieving an end-product in high yield and purity.

Palmitic acid is a scarce raw material, especially if it should be an organic variant, since there is not a lot of organic palm oil, but with the present process it is possible to utilize more or less all of the palmitic acid present in the starting oil, and there is more or less no discard of the palmitic acid during the process.

In one or more embodiments, the starting vegetable oil composition originate from one of the following sources: palm oil or fraction or derivative thereof, palm kernel oil, corn oil, single stage dry fractionated palm stearin, rice bran oil, peanut oil, coconut oil, soybean oil, cotton oil, or combinations hereof.

In one or more embodiments, the starting vegetable oil composition is organic certified.

In one or more embodiments, the starting vegetable oil composition is not originating from a single cell organism.

In one or more embodiments, the excess free fatty acids and/or non-glyceride esters thereof are excess free fatty acids.

Figure 4:
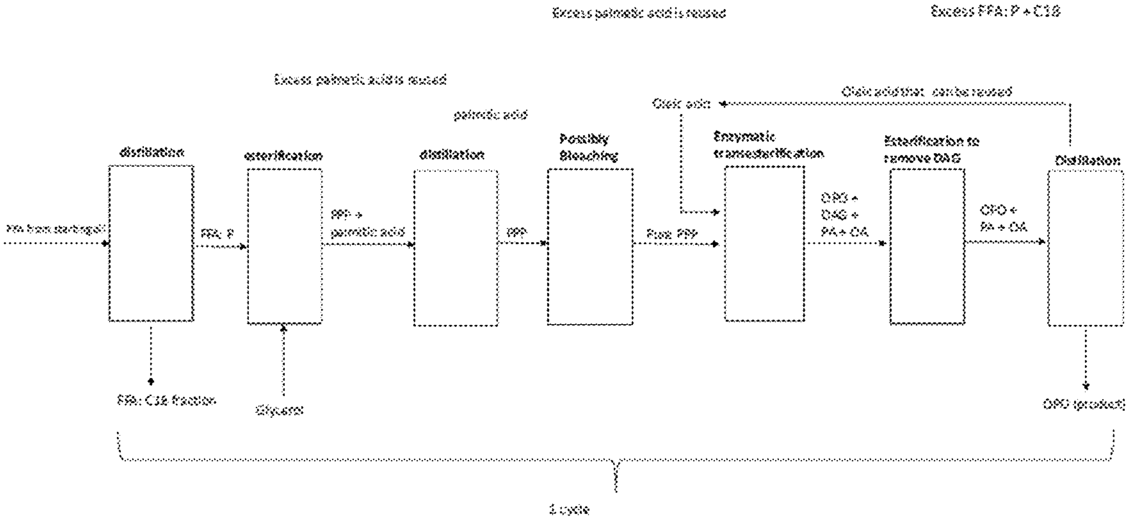
FIG. 4 shows a flow chart over the process according to one aspect of the present disclosure.
Figure 5:
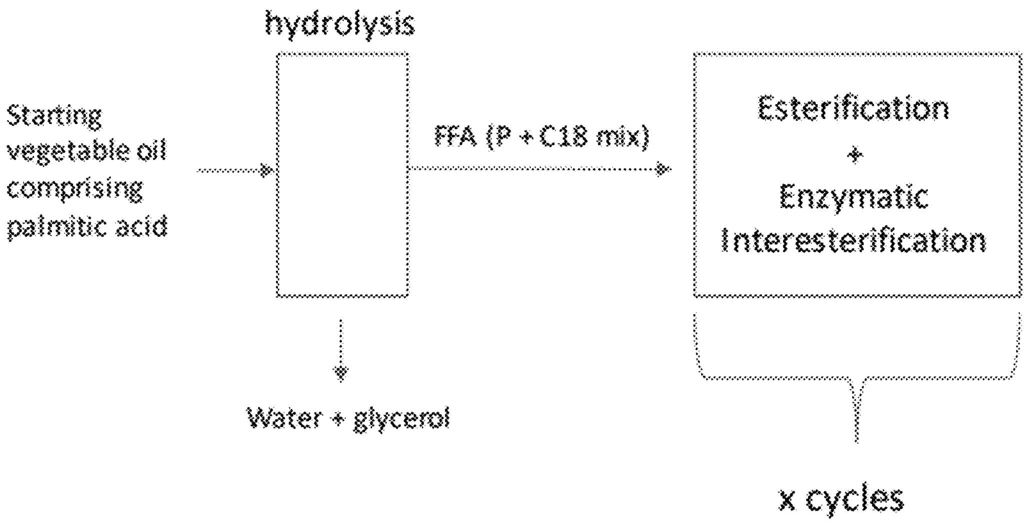
FIG. 5 shows a flow chart over the process according to one aspect of the present disclosure.

FIGS. 4 and 5 shows flowcharts of one embodiment of the process as disclosed herein.

Also disclosed herein is a process for production of a vegetable oil composition having 63% to 97% by weight of total triglycerides (TAGs) being tri-palmitic (PPP) TAGs, wherein the process utilizes at least 70% of the palmitic acid (P, C16:0) present in a starting vegetable oil composition, wherein said process comprises the following steps:

providing said starting vegetable oil composition comprising 80% or less palmitic acid in the triglycerides compared to the total weight of fatty acids in the triglycerides;

subjecting said starting vegetable oil composition to a hydrolysis or alcoholysis process obtaining glycerol and free fatty acids and/or non-glyceride esters thereof;

separating said free fatty acids and/or non-glyceride esters thereof from said glycerol and water/alcohol obtaining a mixture of free fatty acid and/or non-glyceride esters thereof;

performing a distillation process on said mixture of free fatty acid and/or non-glyceride esters thereof to obtain a C18-fatty acid rich fraction and a palmitic acid rich fraction;

esterification of glycerol with said palmitic acid rich fraction from previous step to obtain a mixture of excess free fatty acid and/or non-glyceride esters thereof and a vegetable oil rich in PPP TAGs, performing a distillation and/or neutralization process on the resulting vegetable oil rich in PPP TAGs of previous step to remove the excess free fatty acids and/or non-glyceride esters thereof;

thereby obtaining said vegetable oil composition having 63% to 97% by weight of total triglycerides being tri-palmitic TAGs.

In one or more embodiments of the process for production of a vegetable oil composition having 63% to 97% by weight of total triglycerides (TAGs) being tri-palmitic (PPP) TAGs, no chemical catalyst is used in any of the process steps.

In one or more embodiments of the process for production of a vegetable oil composition having 63% to 97% by weight of total triglycerides (TAGs) being tri-palmitic (PPP) TAGs, the process utilizes at least 75% of the palmitic acid present in a starting vegetable oil composition, such as at least 80%, such as at least 85%, or such as at least 90% of the palmitic acid present in a starting vegetable oil composition.

In one or more embodiments of the process for production of a vegetable oil composition having 63% to 97% by weight of total triglycerides (TAGs) being tri-palmitic (PPP) TAGs, the esterification comprises the steps of:

a) blending the glycerol with said palmitic acid rich fraction to obtain a blend;

b) heating said blend under reduced pressure over a predefined period of time;

c) further increasing the temperature and heating said blend over a predefined period of time and simultaneously lowering the pressure further compared to step b.

d) keeping said blend at the temperature and pressure of step c) for a predefined period of time.

In one or more embodiments of the process for production of a vegetable oil composition having 63% to 97% by weight of total triglycerides (TAGs) being tri-palmitic (PPP) TAGs, the esterification comprises that step b) and step c) are combined into one step by continuously heating the glycerol and fatty acid mixture blend to the wanted temperature under reduced pressure over a predefined time.

In one or more embodiments of the process for production of a vegetable oil composition having 63% to 97% by weight of total triglycerides (TAGs) being tri-palmitic (PPP) TAGs, the esterification comprises that step c) comprises two steps; c1) lowering the pressure compared to step b) over a predefined period of time; c2) increasing the temperature under the reduced pressure of step c1) over a predefined period of time.

In one or more embodiments of the process for production of a vegetable oil composition having 63% to 97% by weight of total triglycerides (TAGs) being tri-palmitic (PPP) TAGs, the esterification comprises that step c1) and step c2) are sequentially in that order. In one or more embodiments step c1) and step c2) are reversed.

In one or more embodiments of the process for production of a vegetable oil composition having 63% to 97% by weight of total triglycerides (TAGs) being tri-palmitic (PPP) TAGs, the esterification comprises that the glycerol and the palmitic acid rich fraction of step a) is mixed at a ratio of 1:3.125 or up to 1:10 (mol glycerol:mol free fatty acid and/or non-glyceride esters thereof) to obtain the blend.

In one or more embodiments of the process for production of a vegetable oil composition having 63% to 97% by weight of total triglycerides (TAGs) being tri-palmitic (PPP) TAGs, the esterification comprises that the step of blending the glycerol with said palmitic acid rich fraction to obtain a blend (step a) is carried out in a container. A container may be any container suitable for carrying out a chemical reaction. Such containers may e.g. be, but not limited to, a flask, a tank, a tube, a laboratory flask, a round-bottom flask, a three-necked flask, a two-necked flask, a one-necked flask, a glass flask, or a metal flask. The reaction may be carried out with or without agitation, such as stirring.

In one or more embodiments of the process for production of a vegetable oil composition having 63% to 97% by weight of total triglycerides (TAGs) being tri-palmitic (PPP) TAGs, the esterification comprises that a condenser is used. The condenser is heated to a temperature of 40° C. to 150° C., such as 50° C. to 90° C., or such as 65° C. to 90° C. This temperature of the condenser is dependent on the size and surface area of the condenser and it is important to use a temperature where water is evaporated while the majority of the glycerol is condensed, to avoid losing too much of the glycerol. A person skilled in the art would know how to adjust this.

In one or more embodiments of the process for production of a vegetable oil composition having 63% to 97% by weight of total triglycerides (TAGs) being tri-palmitic (PPP) TAGs, the esterification comprises that the blend is heated to a temperature in the range of 140° C. to 180° C. in step b). In one or more embodiment of the process, the blend is heated to a temperature in the range of 160° C. to 170° C. in step b).

In one or more embodiments of the process for production of a vegetable oil composition having 63% to 97% by weight of total triglycerides (TAGs) being tri-palmitic (PPP) TAGs, the esterification comprises that the reduced pressure in step b) is in the range of 150 mbar to 400 mbar, such as in the range of 175 mbar to 250 mbar.

In one or more embodiments of the process for production of a vegetable oil composition having 63% to 97% by weight of total triglycerides (TAGs) being tri-palmitic (PPP) TAGs, the esterification comprises that the predefined period of time in step b) is in the range of 15 minutes to 5 hours, such as in the range of 30 minutes to 4 hours.

In one or more embodiments of the process for production of a vegetable oil composition having 63% to 97% by weight of total triglycerides (TAGs) being tri-palmitic (PPP) TAGs, the esterification comprises that the predefined period of time in step b) is at least 15 minutes, such as at least 20 minutes, such as at least 30 minutes, such as at least 1 hour, such as at least 2 hours, such as at least 3 hours.

In one or more embodiments of the process for production of a vegetable oil composition having 63% to 97% by weight of total triglycerides (TAGs) being tri-palmitic (PPP) TAGs, the esterification comprises that the temperature in step c) is in the range of 180° C. to 250° C., such as in the range of 210° C. to 230° C.

In one or more embodiments of the process for production of a vegetable oil composition having 63% to 97% by weight of total triglycerides (TAGs) being tri-palmitic (PPP) TAGs, the esterification comprises that the blend in step c) is heated to at least 160° C.

In one or more embodiments of the process for production of a vegetable oil composition having 63% to 97% by weight of total triglycerides (TAGs) being tri-palmitic (PPP) TAGs, the esterification comprises that the blend in step c) is heated to maximum 230° C. In one or more embodiments, the blend in step c) is heated to maximum 240° C. The temperature is gradually raised when going from step b) to step c). In one or more embodiments, the temperature is raised from around 170° C. in step b) and up to around 210° C. in step c).

In one or more embodiments of the process for production of a vegetable oil composition having 63% to 97% by weight of total triglycerides (TAGs) being tri-palmitic (PPP) TAGs, the esterification comprises that the pressure in step c) is in the range of 10 mbar to 400 mbar, such as in the range of 20 mbar to 250 mbar, such as in the range of 30 mbar to 150 mbar, such as in the range of 30 mbar to 90 mbar, or such as in the range of 30 mbar to 40 mbar. The pressure is gradually decreased when going from step b) to step c). In one or more embodiments, the pressure is decreased from around 200 mbar in step b) and down to around 30 mbar in step c).

In one or more embodiments of the process for production of a vegetable oil composition having 63% to 97% by weight of total triglycerides (TAGs) being tri-palmitic (PPP) TAGs, the esterification comprises that the predefined period of time in step c) is in the range of 15 minutes to 5 hours, such as in the range of 30 minutes to 4 hours.

In one or more embodiments of the process for production of a vegetable oil composition having 63% to 97% by weight of total triglycerides (TAGs) being tri-palmitic (PPP) TAGs, the esterification comprises that the predefined period of time in step c) is at least 15 minutes, such as at least 20 minutes, such as at least 30 minutes, such as at least 1 hour, or such as at least 2 hours.

In one or more embodiments of the process for production of a vegetable oil composition having 63% to 97% by weight of total triglycerides (TAGs) being tri-palmitic (PPP) TAGs, the esterification comprises that a catalyst is added in step a). The catalyst can be any catalyst known to be beneficial in an esterification process. In one or more embodiment, the catalyst is an organic catalyst. In one or more embodiments, zinc oxide is used as a catalyst. Hence, in one or more embodiments of the present process, zinc oxide (ZnO) is added in step a) as a catalyst. As it is known to the person skilled in the art, the predefined amount of time in step d) will decrease if a catalyst is used.

In one or more embodiments of the process for production of a vegetable oil composition having 63% to 97% by weight of total triglycerides (TAGs) being tri-palmitic (PPP) TAGs, the process further comprises the following steps:

- mixing the obtained vegetable oil composition having 63% to 97% by weight of total triglycerides being tri-palmitic TAGs with a fatty acid composition rich in C18-fatty acids and/or non-glyceride esters thereof to obtain a first mixture;
- performing an enzymatic transesterification process by use of one or more 1,3-specific enzymes to said first mixture from previous step thereby obtaining a crude vegetable oil blend;

separating the resulting crude vegetable oil blend of previous step to obtain a mixture of excess free fatty acids and/or non-glyceride esters thereof and;

obtaining a final vegetable oil composition having palmitic acid present in the sn2-position.

In one or more embodiments of the process for production of a vegetable oil composition having 63% to 97% by weight of total triglycerides (TAGs) being tri-palmitic (PPP) TAGs, the enzymatic transesterification process is performed by adding the one or more 1,3-specific enzymes to said first mixture or by pumping said first mixture through a column comprising one or more 1,3-specific enzymes. In one or more embodiments, the temperature of the enzymatic transesterification process is in the range of 40° C. to 75° C., such as in the range of 50° C. to 70° C., or such as in the range of 55° C. to 65° C.

In one or more embodiments of the process for production of a vegetable oil composition having 63% to 97% by weight of total triglycerides (TAGs) being tri-palmitic (PPP) TAGs, the separating step is performed by a distillation and/or a neutralization process on the resulting crude vegetable oil blend to remove the excess free fatty acids and/or non-glyceride esters thereof.

In one or more embodiments of the process for production of a vegetable oil composition having 63% to 97% by weight of total triglycerides (TAGs) being tri-palmitic (PPP) TAGs, the step of performing a distillation and/or neutralization process on the resulting vegetable oil rich in PPP TAGs to remove the excess free fatty acids and/or non-glyceride esters thereof is a physical refinement. In one or more embodiments the distillation takes place at a temperature of at least 160° C., and optionally under reduced pressure. In one or more embodiments the distillation takes place at a temperature of at least 190° C. and under reduced pressure. In one or more embodiments the distillation takes place at a temperature of between 220° C. and 260° C. and under reduced pressure, such as around 240° C. and under reduced pressure. This is standard conditions for a distillation process as known by the person skilled in the art. In one embodiment, chemical refinement can be used instead of physical refinement and the skilled person will then know to change the temperature to around 100° C.

In one or more embodiments of the process for production of a vegetable oil composition having 63% to 97% by weight of total triglycerides (TAGs) being tri-palmitic (PPP) TAGs, the step of hydrolysis may take place at high pressure and high temperature in a counter-current reaction tower. The glycerol may be re-used in the process once water has been removed. After the hydrolysis step the hydrolysed fatty acids can be purified by distillation.

The present disclosure also comprises a vegetable oil composition having at least 50% palmitic acid present in the sn2-position out of total palmitic acid in the triglycerides of the vegetable oil composition, obtained by the process as disclosed herein.

Also disclosed is a vegetable oil composition having at least 50% palmitic acid present in the sn2-position out of total palmitic acid in the triglycerides of the vegetable oil composition.

In one or more embodiments of the vegetable oil composition, the proportion of palmitic acid in sn2-position out of total palmitic acid in the vegetable oil composition is 52% or more, such as 55% or more, such as 60% or more, or such as more than 70%. In one or more embodiments of the vegetable oil composition, the proportion of palmitic acid in sn2-position out of total palmitic acid in the vegetable oil composition is in the range of 52% to 80%, such as in the range of 52% to 75%, such as in the range of 52% to 70%, or such as in the range of 55% to 70%.

In one or more embodiments, the vegetable oil composition comprises between 30% and 60% by weight of palmitic acid in the triglycerides compared to the total weight of fatty acids in the triglycerides in the vegetable oil composition, such as between 30% and 50%, such as between 35% and 45%, or such as between 40% and 45%. In one or more embodiments, the vegetable oil composition comprises at least 30% by weight of palmitic acid in the triglycerides compared to the total weight of fatty acids in the triglycerides in the vegetable oil composition, such as at least 35%, or such as at least 40%.

In one or more embodiments, of the vegetable oil composition, the ratio of oleic acid to linoleic acid (oleic acid:linoleic acid) in the triglycerides of the vegetable oil composition is in the range of 10:1 to 1:2, such as in the range of 5:1 to 1:1.

In one or more embodiments, of the vegetable oil composition, 40% or more of the triglycerides in the final vegetable oil composition is of the type OPO, OPL, and/or LPL.

In one or more embodiments, 40% or more of the triglycerides in the final vegetable oil composition is of the type OPO.

Disclosed herein is also use of a vegetable oil composition having at least 50% palmitic acid present in the sn2-position out of total palmitic acid in the triglycerides of the vegetable oil composition according to the present disclosure in the manufacture of an infant formula.

Disclosed herein is also use of a vegetable oil composition having at least 50% palmitic acid present in the sn2-position out of total palmitic acid in the triglycerides of the vegetable oil composition according to the present disclosure in the manufacture of a plant based food product.

Further disclosed is an infant formula comprising from 15% to 100% by weight of a vegetable oil composition having at least 50% palmitic acid present in the sn2-position out of total palmitic acid in the triglycerides of the vegetable oil composition according to the present disclosure.

In one or more embodiments, the infant formula comprising from 20% to 90% by weight of a vegetable oil composition having at least 50% palmitic acid present in the sn2-position out of total palmitic acid in the triglycerides of the vegetable oil composition, such as from 20% to 80% by weight, or such as from 20% to 70% by weight.

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The present invention is further illustrated by the following examples, which are not to be construed as limiting the scope of protection.

EXAMPLES

Example 1—Producing an Oil Rich in PPP TAGs (PPP) from Palm Fractions

Different oils comprising palmitic acid can be used as starting oil composition. For this example three different palm fractions have been used: palm stearin, palm oil, and palm olein. Table 1 shows the composition of the three oils.

TABLE 1

| Fatty acids | Palm stearin | Palm oil | Palm olein |
|---|---|---|---|
| Iodine value (IV)* | 34 | 53 | 62 |
| C16:0** | 60% | 42% | 35% |
| C18:0** | 5% | 5% | 4% |
| C18:1** | 27% | 40% | 46% |
| C18:2** | 6% | 10% | 13% |

*analysed with IUPAC 2.205
**analysed with IUPAC 2.304

The palm fractions are split into free fatty acids (FFA), water, and glycerol via a standard counter-current hydrolysis at high pressure and excess water. The FFA fractions are transferred to a distillation unit where the FFAs are separated (split) into a palmitic rich fraction (P rich fraction) and an oleic rich fraction (O rich fraction), respectively. The resulting fractions have the following compositions as shown in table 2a, 2b and 2c.

A person skilled in the art will know that the characteristics of the stripping column, the applied temperature, and reflux determines the split of the different fatty acids. In these cases approx. 6% of the residual palmitic acid was found in the oleic rich fractions. In principle the amount of palmitic acid found in the C18 stream, can be lowered at the expense of less capacity in the distillation column.

TABLE 2a

| (Palm oil): | | | |
|---|---|---|---|
| | Starting oil | P rich fraction | O rich fraction |
| Yield | | 40% | 60% |
| C16:0* | 42% | 98% | 5% |
| C16 sn2 | 14% | — | — |
| C18:0* | 5% | 0% | 8% |
| C18:1* | 40% | 1% | 67% |
| C18:2* | 10% | 0% | 17% |

TABLE 2b

| (palm stearin): | | | |
|---|---|---|---|
| | Starting oil | P rich fraction | O rich fraction |
| Yield | | 58% | 42% |
| C16:0* | 60% | 97% | 8% |
| C16 sn2 | 40% | — | — |
| C18:0* | 5% | 0% | 11% |
| C18:1* | 27% | 2% | 63% |
| C18:2* | 6% | 0% | 14% |

TABLE 2c

| (Palm olein): | | | | |
|---|---|---|---|---|
| | Start | P rich fraction | O rich fraction | |
| Yield | | 35% | 65% | |
| C16:0* | 36% | 96% | 4% | |
| C18:0* | 4% | 0% | 6% | |
| C18:1* | 46% | 3% | 68% | |
| C18:2* | 13% | 1% | 19% | |
| C18:2** | | 6% | 10% | 13% |

*analysed with IUPAC 2.304

*analyzed using IUPAC 2.304

Glycerol and free fatty acids were then mixed in a reaction vessel in the ratio of 1:4 by weight (33% excess free fatty acids) where the free fatty acids in this example is comprising 98% by weight of C16:0, 1% by weight of C18:1, and 1% fatty acids not being C:16 nor C18:1 (starting oil is palm oil, see table 2a). The reaction vessel is equipped with a vacuum inlet, a cold trap, and a condenser heated to 70° C. The reaction mixture was heated to 150° C. over approximately 20 minutes under reduced pressure (200 mbar). The temperature was gradually increased to 210° C. while the pressure was gradually decreased to 33 mbar over a period of 30 minutes to 60 minutes. Once the final reaction temperature was reached the reaction mixture was left at these conditions for 5 hours. The crude oil obtained was then distilled at 240° C. under reduced pressure to remove excess free fatty acids to yield the oil rich in PPP TAGs consisting of 97.9% TAGs, 1.3% DAGs and 0.4% FFA as shown in table 3 below.

Table 3 showing the composition of the oil rich in PPP TAGs (also simply called PPP or tripalmitin).

| | PPP |
|---|---|
| TAG | 98% |
| DAG** | 1% |
| FFA**** | 0.4% |
| C16:0* | 98% |
| C18:1* | 1% |
| TAG C 48*** | 95% |
| TAG C 50*** | 3% |

*analyzed using IUPAC 2.304
**Diglycerides and monoglycerides are given in % of acylglycerols and analysed with AOCS Cd 11d-96
***analysed with IUPAC 2.323
****analysed with IUPAC 2.201.

The formed oil rich in PPP TAGs has 98% P (sn2). This is to be compared to 14% for palm oil having an IV of 52 and 40% for palm stearin having an IV of 34, respectively.

Example 2—Enzymatic Transesterification of the Oil Rich in PPP TAGs (Tripalmitin, PPP) and a Composition of Free Fatty Acids Rich in C18-Fatty Acids (1:2 w/w Ratio)

First 3.95 kg feed mixture was prepared by mixing tripalmitin (1.3 kg) and free fatty acids rich in C18-fatty acids (2.65 kg) in a ratio of 1:2 by weight.

Composition of the utilized PPP and the free fatty acid rich in C18-fatty acids are shown in table 4.

TABLE 4

| | post IV 13 | PPP | free fatty acids rich in C18-fatty acids |
|---|---|---|---|
| C16:0* | 82 | 98 | 2 |
| C18:0* | 5 | — | 2 |
| C18:1* | 10 | 1 | 82 |
| C18:2* | 2 | — | 12 |
| | post IV 13 | PPP | |
| TAG C 46** | 2 | 1 | — |
| TAG C 48** | 62 | 95 | — |
| TAG C 50** | 24 | 3 | — |
| TAG C 52** | 8 | — | — |
| TAG C 54** | 3 | — | — |

*analyzed using IUPAC 2.304
**analysed with IUPAC 2.323

This mixture was reacted by feeding it through a column with 10 g of the 1,3-specific lipase DF IM (Amano Japan) at 60° C., with a flow of 40 gram/hour, corresponding to 4 gram oil/gram enzyme/hour. After approximately 95 hours (slightly more than 4 days) the reaction was stopped. Samples had been taken throughout the reaction to monitor enzyme activity and quality of product over time (see FIG. 1).

After splitting the formed TAGs and the excess free fatty acids, the resulting compositions are obtained (shown in table 5 below).

TABLE 5

| | Product made from PPP and free fatty acids rich in C18-fatty acids |
|---|---|
| TAG C 48* | 12 |
| TAG C 50* | 40 |
| TAG C 52* | 44 |
| TAG C 54* | 3 |

*analysed with IUPAC 2.323

C52 can be seen as a measure of OPO, OPL, LPL etc while C50 is an intermediate product (PPO or PPL etc).

Table 6 below shows the fatty acid composition in the product made from PPP and free fatty acids rich in C18-fatty acids and in the fatty acids mixture, after it has been distilled from the TAGs.

TABLE 6

| | Product | FFA mixture (to be recycled) |
|---|---|---|
| C16:0* | 52% | 24% |
| C18:0* | 2% | 1% |
| C18:1* | 40% | 64% |
| C18:2* | 6% | 11% |

*analyzed using IUPAC 2.304

Example 3—Enzymatic Transesterification of the Oil Rich in PPP TAGs (Tripalmitin, PPP) and a Composition of Free Fatty Acids Rich in C18-Fatty Acids (1:4 w/w Ratio)

Figure 2:
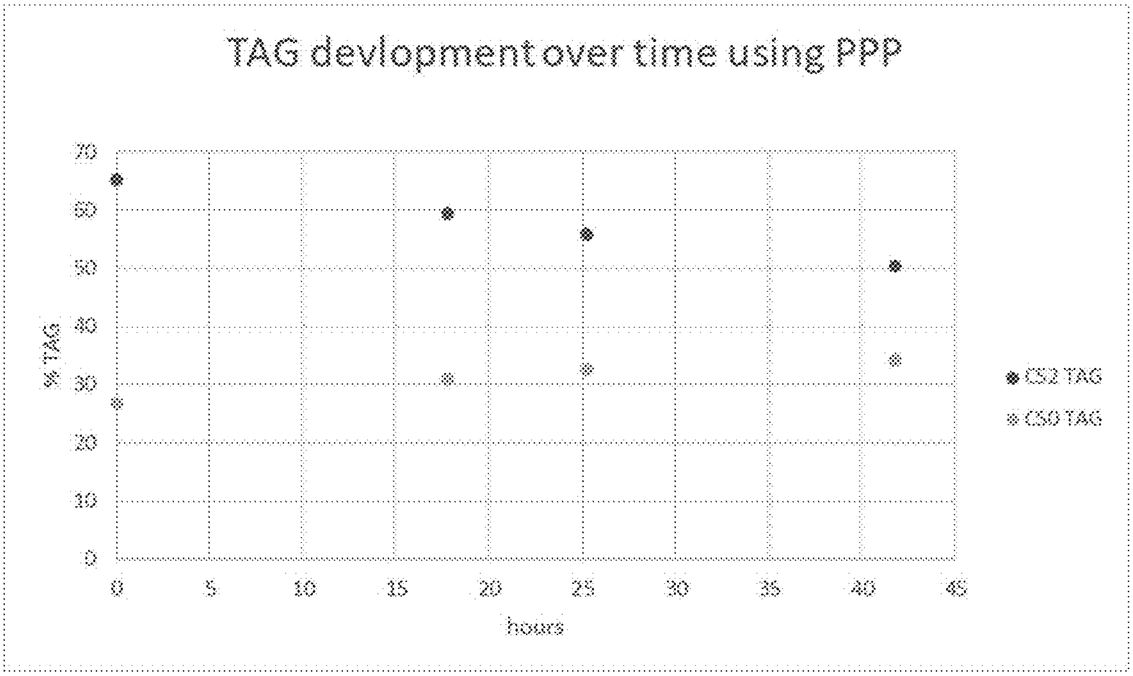
FIG. 2 shows TAG development over time using PPP as in example 3.

This example is run under the exact same conditions as example 2, the only difference is that the ratio of PPP to fatty acids rich in C18-fatty acids is in a ratio of 1:4 by weight instead of 1:2 by weight as in example 2. Samples had been taken throughout the reaction to monitor enzyme activity and quality of product over time (see FIG. 2). This results in a product with a higher amount of the palmitic acid in the sn2-position out of the total palmitic acid present. The amount of C52 formed is significantly higher and the average P (sn2)/P total is 68%.

Example 4—Comparative Example: Enzymatic Transesterification of Palm Oil Stearin (POST) having an Iodine Value (IV) of 13 and a Composition of Free Fatty Acids Rich in C18-Fatty Acids The exact same process as in example 2 is carried out. Only this time the starting material is a palm oil stearin (POST) having an iodine value (IV) of 13 (POST IV 13). Composition of the utilized POST IV 13 and the free fatty acid rich in C18-fatty acids used in this example are shown in table 4 in example 2. This should be seen as a context example of how the process would look today, without having an oil rich in PPP TAGs available.

Figure 3:
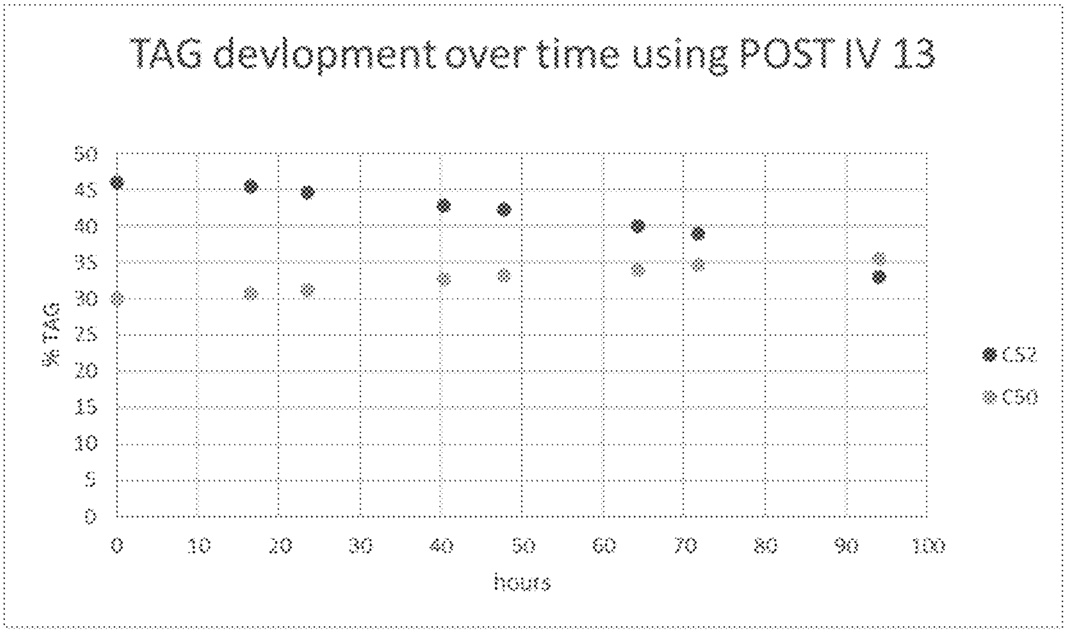
FIG. 3 shows TAG development over time using POST IV 13 as in example 4.

First 3.95 kg feed mixture was prepared by mixing palm stearin IV 13 (1.3 kg) and free fatty acids rich in C18-fatty acids (2.65 kg) in a ratio of 1:2 by weight. This mixture was fed through a column with 10 g of the 1,3-specific lipase DF IM (Amano Japan) at 60° C., with a flow of 40 gram/hour, corresponding to 4 gram oil/gram enzyme/hour. After app 95 hours (slightly more 15 than 4 days) the reaction was stopped. Samples had been taken throughout the reaction to monitor enzyme activity and quality of product over time (see FIG. 3). C52 can be seen as a measure of OPO, OPL, LPL etc while C50 is an intermediate product (PPO, PPL etc). As more oil is passed through the enzymes, the enzymatic activity drops, which gives rise to a decrease in the formation of C52 and an increase in the formation of C50.

Comparing the results from the two enzymatic transesterification reactions it can be seen that utilizing tripalmitin produced via the esterification process compared to a standard palm stearin yields a product of better quality, as measured by a significantly higher amount of palmitic acid in the sn2-position (72% vs 93%—see table 8), resulting in a higher concentration of OPO in the product made using the PPP starting material compared with a palm stearin starting material.

From table 4 it is evident that the oil rich in PPP TAGs (PPP) produced has high yielding in palmitic acid (98%) and that the amount of PPP obtained is close to 95% (as compared to 62% for POST IV 13), which is a very good starting point for making an oil composition having a high amount of palmitic acid present in the sn2-position, such as OPO.

Conclusion from the Above Examples

In table 7 is a comparison of the products before and after the enzymatic transesterification.

Table 7 showing the TAGs before and after the enzymatic transesterification:

| | starting oil material | | product made from | | |
|---|---|---|---|---|---|
| | POSt IV 13 | PPP | POST IV 13 | PPP (1:2 w/w) | PPP (1:4 w/w) |
| TAG C 48* | 62 | 95 | 8 | 12 | 7 |
| TAG C 50* | 24 | 3 | 31 | 40 | 32 |
| TAG C 52* | 8 | — | 45 | 44 | 58 |
| TAG C 54* | 3 | — | 14 | 3 | 1 |
| P (sn2)/P (total)** | | | 58 | 60 | 68 |
| OPO/POO*** | | | 4.3 | >13 | |

*analysed with IUPAC 2.323

**% C16:0 in sn2 out of total C16:0 is calculated as 100/3 * (C16:0 in the sn2 position measured with IUPAC 2.210)/(C16:0 measured with IUPAC 2.304), where the 3 in the denominator is due to the three positions in the triglycerides

***The analysis can be done by any known method by a commercial laboratory.

Table 8 shows the different fatty acid content in the sn-2 position of the POST IV 13 and the PPP in both the starting oil material and in the resulting products.

| | starting oil composition | | Oil composition product made from | |
|---|---|---|---|---|
| | POST IV 13 | PPP | POST IV 13 | PPP |
| Fatty acid content in sn-2-pos C14:0* | 1% | — | 1% | 1% |
| Fatty acid content in sn-2-pos C16:0* | 75% | 98% | 72% | 93% |
| Fatty acid content in sn-2-pos C18:0* | 3% | — | 2% | 1% |
| Fatty acid content in sn-2-pos C18:1* | 16% | 1% | 20% | 4% |
| Fatty acid content in sn-2-pos C18:2* | 4% | — | 4% | 1% |

*Fatty acid composition in the sn2-position is given as % of fatty acid residues in the sn2 position and is analysed with IUPAC 2.210.

From table 7 and 8 it is evident that the PPP produced contains much more palmitic acid than the POST IV 13 reference in the sn2-position. Therefore, this should be a better starting point for making an oil composition having a high amount of palmitic acid present in the sn2-position, such as OPO. This is indeed also the case. Looking at the ratio of OPO and the asymmetric counterpart POO (or OOP) is it clear that the ratio is much higher (more than a factor of 3), starting from PPP, see Table 7.

Example 5

Starting with 10 kg palm oil (with 42% palmitic acid), a palmitic rich fraction is obtained with a 40% yield (example 1). The palmitic acid in 33% excess is then reacted with glycerol to obtain PPP triglycerides (example 1). Of the starting palmitic acid (42%), 29% is present in the PPP (leaving 10% excess for the next cycle). An enzymatic interesterification is then carried out using the PPP as a starting material (example 2). The resulting OPO rich oil contains 52% palmitic acid which equals 15% of the starting palmitic acid (leaving 14% for the next cycle). So, in the first cycle, 15%/42%=36% of the palmitic acid from the starting palm oil, has been recovered in the product, while (10%+14%)/42%=57% will be recycled into the next cycle (resulting in a 7% loss of palmitic acid). This process is then repeated with the recovered palmitic acid, and the next cycle recovered further 21% of the palmitic acid from starting palm oil, thereby yielding a recovery of the starting palm oil of =36%+21%=57%. The table below shows the percentage of palmitic acid recovered over the first 4 cycles. The first process of obtaining the needed free fatty acids is pictured in FIG. 5, while the process of cycling the palmitic acid in shown in FIG. 4.

| | Cycle | | | |
|---|---|---|---|---|
| | 1 | 2 | 3 | 4 |
| Palmitic acid in product/palmitic acid in starting palm oil | 36% | 21% | 13% | 8% |
| Cumulative palmitic acid in product/palmitic acid in starting palm oil | 36% | 57% | 69% | 77% |

The cumulative amount of palmitic acid in the product vs. the amount present in the starting oil will depend on several factors, among others:

If the loss of palmitic acid in the distillation is reduced, the recovered amount of palmitic acid per cycle will increase If a more pure OPO is produced, less palmitic acid will be present in the OPO product and the recovered amount of palmitic acid per cycle will be reduced The invention is further described in the following non-limiting items.

1. A process for production of a final vegetable oil composition having at least 50% palmitic acid present in the sn2-position out of total palmitic acid in the triglycerides of the final vegetable oil composition, wherein said process comprises a step of providing a starting vegetable oil composition comprising palmitic acid in the triglycerides, a step of performing an enzymatic transesterification process, and a step of using excess free fatty acids and/or non-glyceride esters thereof obtained during the process and recycling them back into the process; wherein at least 70% by weight out of the total amount of palmitic acid in the starting vegetable oil composition is present in the final vegetable oil composition.
2. The process according to item 1, wherein the process further comprises the steps of:
   I. performing a hydrolysis or alcoholysis process and further a distillation thereby obtaining at least a palmitic acid rich fraction;
   II. performing an esterification of glycerol with said palmitic acid rich fraction to obtain at least a vegetable oil rich in PPP TAGs;
   III. subjecting said vegetable oil rich in PPP TAGs to the enzymatic transesterification process with a fatty acid composition, thereby obtaining a crude vegetable oil blend;
   IV. separating the crude vegetable oil blend to obtain a mixture of excess free fatty acids and/or non-glyceride esters thereof and the final vegetable oil composition having palmitic acid present in the sn2-position;
   V. using the mixture of excess free fatty acids and/or non-glyceride esters thereof obtained during the process and recycling them back into the process.
3. The process according to item 2, wherein the fatty acid composition of step III is a fatty acid composition rich in C18-fatty acids and/or non-glyceride esters thereof.
4. The process according to item 2 or 3, wherein step I comprises the following steps:
   Ia. subjecting said starting vegetable oil composition to a hydrolysis or alcoholysis process obtaining glycerol and free fatty acids and/or non-glyceride esters thereof;
   Ib. separating said free fatty acids and/or non-glyceride esters thereof from said glycerol and water/alcohol obtaining a mixture of free fatty acid and/or non-glyceride esters thereof;
   Ic. performing a distillation process on said mixture of free fatty acid and/or non-glyceride esters thereof to obtain a C18-fatty acid rich fraction and a palmitic acid rich fraction.
5. The process according to any of items 2 to 4 wherein step III comprises the following steps:
   IIIa. performing a distillation and/or neutralization process on the resulting vegetable oil rich in PPP TAGs of step II to remove the excess free fatty acids and/or non-glyceride esters thereof; thereby obtaining a vegetable oil composition having 63% to 97% by weight of total triglycerides being tri-palmitic TAGs;

IIIb. mixing the obtained vegetable oil composition having 63% to 97% by weight of total triglycerides being tri-palmitic TAGs with a fatty acid composition rich in C18-fatty acids and/or non-glyceride esters thereof to obtain a first mixture;

IIIc. performing an enzymatic transesterification process by use of one or more 1,3-specific enzymes to said first mixture from step IIIb thereby obtaining a crude vegetable oil blend.

6. The process according to any of the proceeding items, wherein the starting vegetable oil composition comprises 80% or less by weight of palmitic acid in the triglycerides compared to the total weight of fatty acids in the triglycerides.

7. The process according to any of items 4 to 6, wherein the step of using excess free fatty acids and/or non-glyceride esters thereof obtained during the process and recycling them back into the process comprises using the mixture of excess free fatty acids and/or non-glyceride esters thereof obtained from step IV and providing them to the mixture of step Ic.

8. The process according to any of items 2 to 7, wherein the process further comprises splitting the mixture of excess free fatty acids and/or non-glyceride esters thereof from step IV by a distillation process, thereby obtaining a palmitic acid (P, C16:0) rich fraction and a C18-fatty acid rich fraction and using at least a part of the palmitic acid rich fraction in step II.

9. The process according to item 8, wherein the process further comprises a distillation process of the C18-fatty acid rich fraction and using at least a part of the C18-fatty acid rich fraction in step IIIb.

10. The process according to any of items 5 to 9, wherein the C18-fatty acid rich fraction from step Ic is used in step IIIb.

11. The process according to any of items 4 to 10 wherein the process further comprises a step of separating glycerol and water/alcohol from step Ib and using the obtained glycerol of said step in the esterification step II.

12. The process according to any of items 5 to 11, wherein the process further comprises a step of using the excess free fatty acids and/or non-glyceride esters thereof obtained from step IIIa and further providing them to the esterification step II.

13. The process according to any of items 5 to 12, wherein the process further comprises bleaching and/or neutralization of the resulting product of the distillation and/or neutralization process of step IIIa.

14. The process according to any of items 2 to 13, wherein the process further comprises bleaching and/or neutralization and/or deodorization of the resulting final vegetable oil composition of the separation of step IV.

15. The process according to any of items 5 to 14, wherein the vegetable oil composition obtained after step IIIa is having 70% to 97% by weight of total triglycerides being tri-palmitic TAGs, such as 85% to 97% by weight of total triglycerides being tri-palmitic TAGs.

16. The process according to any of items 5 to 15, wherein the proportion of palmitic acid in sn2-position out of total fatty acids in the sn2-position in the triglycerides of the vegetable oil composition obtained after step IIIa is in the range of from 85% to 99%.

17. The process according to any of items 5 to 16, wherein the vegetable oil composition obtained after step IIIa has an amount of diglycerides and/or monoglycerides of no more than 6%, such as no more than 3%, or such as no more than 2% compared to the total weight of the vegetable oil composition.

18. The process according to any of the proceeding items, wherein the proportion of palmitic acid in sn2-position out of total palmitic acid in the triglycerides of the final vegetable oil composition is 52% or more, such as 55% or more, such as 60% or more, or such as 70% or more.

19. The process according to any of the proceeding items, wherein the final vegetable oil composition comprises between 30% and 60% by weight of palmitic acid in the triglycerides compared to the total weight of fatty acids in the triglycerides in the final vegetable oil composition, such as between 30% and 50%, such as between 35% and 45%, or such as between 40% and 45%.

20. The process according to any of the proceeding items, wherein the ratio of oleic acid to linoleic acid (oleic acid:linoleic acid) in the triglycerides of the final vegetable oil composition is in the range of 10:1 to 1:2, such as in the range of 5:1 to 1:1.

21. The process according to any of the proceeding items, wherein at least 75% by weight out of the total amount of palmitic acid in the starting vegetable oil composition is present in the final vegetable oil composition, such as at least 80%, such as at least 90%, or such as at least 95% by weight out of the total amount of palmitic acid in the starting vegetable oil composition is present in the final vegetable oil composition.

22. The process according to any of the proceeding items, wherein no chemical catalyst is used in any of the process steps.

23. The process according to any of the proceeding items, wherein any enzyme used is a non-genetically modified enzyme.

24. The process according to any of the proceeding items, wherein no organic solvents are used in any of the process steps.

25. The process according to any of the proceeding items, wherein the starting vegetable oil composition comprises at least 9% palmitic acid in the triglycerides compared to the total weight of fatty acids in the triglycerides, such as at least 15%, such as at least 25%, such as at least 35%, such as at least 40%, such as at least 50%, or such as at least 60% palmitic acid.

26. The process according to any of the proceeding items, wherein the starting vegetable oil composition has an iodine value of at least 15, such as at least 20, such as at least 25, such as at least 30, such as at least 35, such as at least 40, such as at least 45, such as at least 50, such as at least 55, or such as at least 60.

27. The process according to any of the proceeding items, wherein the starting vegetable oil composition originate from one of the following sources: palm oil or fraction or derivative thereof, palm kernel oil, corn oil, single stage dry fractionated palm stearin, rice bran oil, peanut oil, coconut oil, soybean oil, cotton oil, or combinations hereof.

28. A vegetable oil composition having at least 50% palmitic acid present in the sn2-position out of total palmitic acid in the triglycerides of the vegetable oil composition, obtained by the process according to any of the proceeding items.

29. The vegetable oil composition according to item 28, wherein the proportion of palmitic acid in sn2-position out of total palmitic acid in the vegetable oil composition is 52% or more, such as 55% or more, such as 60% or more, or such as more than 70%.

30. The vegetable oil composition according to any of items 28 or 29, comprising between 30% and 60% by weight of palmitic acid in the triglycerides compared to the total weight of fatty acids in the triglycerides in the vegetable oil composition, such as between 30% and 50%, such as between 35% and 45%, or such as between 40% and 45%.
31. The vegetable oil composition according to any of items 28 to 30, wherein the ratio of oleic acid to linoleic acid (oleic acid:linoleic acid) in the triglycerides of the vegetable oil composition is in the range of 10:1 to 1:2, such as in the range of 5:1 to 1:1.
32. A vegetable oil composition having at least 50% palmitic acid present in the sn2-position out of total palmitic acid in the triglycerides of the vegetable oil composition.
33. The vegetable oil composition according to item 32, wherein the proportion of palmitic acid in sn2-position out of total palmitic acid in the vegetable oil composition is 52% or more, such as 55% or more, such as 60% or more, or such as more than 70%.
34. The vegetable oil composition according to any of items 32 or 33, comprising between 30% and 60% by weight of palmitic acid in the triglycerides compared to the total weight of fatty acids in the triglycerides in the vegetable oil composition, such as between 30% and 50%, such as between 35% and 45%, or such as between 40% and 45%.
35. The vegetable oil composition according to any of items 32 to 34, wherein the ratio of oleic acid to linoleic acid (oleic acid:linoleic acid) in the triglycerides of the vegetable oil composition is in the range of 10:1 to 1:2, such as in the range of 5:1 to 1:1.
36. Use of a vegetable oil composition having at least 50% palmitic acid present in the sn2-position out of total palmitic acid in the triglycerides of the vegetable oil composition, according to any of items 28 to 36 in the manufacture of an infant formula.
37. Use of a vegetable oil composition having at least 50% palmitic acid present in the sn2-position out of total palmitic acid in the triglycerides of the vegetable oil composition, according to any of items 28 to 36 in the manufacture of a plant based food product.
38. An infant formula comprising from 15% to 100% by weight of a vegetable oil composition having at least 50% palmitic acid present in the sn2-position out of total palmitic acid in the triglycerides of the vegetable oil composition.

The invention claimed is:

1. A process for production of a final composition having at least 50% palmitic acid present in the sn2-position out of total palmitic acid in the triglycerides of the final composition, wherein said process comprises a step of providing a starting composition, formed in part from a vegetable oil, comprising palmitic acid chains in triglycerides, a step of processing the starting composition by performing an enzymatic transesterification of the triglycerides of the starting composition to produce the final composition, a step of collecting palmitic acid and/or non-glyceride esters thereof remaining after the enzymatic transesterification and introducing them into the process; wherein at least 70% by weight of the total amount of palmitic acid in the vegetable oil is present in the final composition following the enzymatic transesterification and wherein any collected palmitic acid and/or non-glyceride esters thereof after the enzymatic transesterification can be employed in a subsequent processing to the starting composition.

2. The process according to claim 1, wherein the process further comprises the steps of:

I. performing a hydrolysis or alcoholysis and, further, distillation on the hydrolysed or alcoholysed vegetable oil, thereby obtaining at least a palmitic acid fraction;
II. performing an esterification of glycerol with said palmitic acid fraction to obtain at least a vegetable composition comprising triglycerides (TAGs) being tri-palmitic (PPP);
III. mixing said vegetable composition and a fatty acid composition to produce the starting composition, and subjecting said vegetable composition to the enzymatic transesterification with the fatty acid composition, thereby obtaining a crude vegetable oil blend;
IV. separating the crude vegetable oil blend to obtain a mixture of free fatty acids and/or non-glyceride esters thereof and the final composition having palmitic acid present in the sn2-position; and
V. collecting the mixture of free fatty acids and/or non-glyceride esters thereof remaining after the enzymatic transesterification and introducing them into the process.

3. The process according to claim 2, wherein the fatty acid composition of the step III is a fatty acid composition comprising C18-fatty acids and/or non-glyceride esters thereof.

4. The process according to claim 2, wherein the step I comprises the following steps:

Ia. subjecting said vegetable oil to a hydrolysis or alcoholysis to obtain glycerol and free fatty acids and/or non-glyceride esters thereof;
Ib. separating said free fatty acids and/or non-glyceride esters thereof from said glycerol and water/alcohol to obtain a mixture of free fatty acid and/or nonglyceride esters thereof; and
Ic. performing a distillation on said mixture of free fatty acid and/or nonglyceride esters thereof to obtain a C18-fatty acid fraction and a palmitic acid fraction.

5. The process according to claim 2, wherein the step III comprises the following steps:

IIIa. performing a distillation and/or neutralization on the resulting vegetable composition of the step II to remove any remaining free fatty acids and/or non-glyceride esters thereof; thereby obtaining a vegetable composition comprising PPP having 63% to 97% by weight of total triglycerides being tri-palmitic TAGs;
IIIb. mixing the obtained vegetable composition with a fatty acid composition comprising C18-fatty acids and/or non-glyceride esters thereof to obtain the starting composition; and
IIIc. performing an enzymatic transesterification by use of one or more 1,3-specific enzymes to said first mixture from step IIIb, thereby obtaining a crude vegetable oil blend.

6. The process according to claim 1, wherein the starting vegetable oil composition comprises 80% or less by weight of palmitic acid in the triglycerides compared to the total weight of fatty acids in the triglycerides.

7. The process according to claim 4, wherein the step of collecting free fatty acids and/or non-glyceride esters thereof remaining after the enzymatic transesterification and introducing them into the process comprises using the mixture of free fatty acids and/or non-glyceride esters thereof obtained from the step IV and providing them to the mixture of the step Ic.

8. The process according to claim 2, wherein the process further comprises splitting the mixture of free fatty acids and/or non-glyceride esters thereof from the step IV by distillation, thereby obtaining a palmitic acid (P, C16:0) fraction and a C18-fatty acid fraction and using at least a part of the palmitic acid fraction in the step II.

9. The process according to claim 8, wherein the process further comprises distillation of the C18-fatty acid fraction and using at least a part of the C18-fatty acid fraction in the step IIIb.

10. The process according to claim 5, wherein the C18-fatty acid fraction from the step Ic is used in the step IIIb.

11. The process according to claim 4, wherein the process further comprises a step of separating glycerol and water/alcohol from the step Ib and using the obtained glycerol of said step in the esterification step II.

12. The process according to claim 5, wherein the process further comprises a step of using the free fatty acids and/or non-glyceride esters thereof obtained from the step IIIa and further providing them to the esterification step II.

13. The process according to claim 1.

14. The process according to claim 1, wherein the starting vegetable oil composition has an iodine value of at least 15.

15. The process according to claim 1, wherein the starting vegetable oil composition has an iodine value of at least 20.

16. The process according to claim 1, wherein the starting vegetable oil composition has an iodine value of at least 25.

17. The process according to claim 1, wherein the starting vegetable oil composition has an iodine value of at least 30.

18. The process according to claim 1, wherein the starting vegetable oil composition has an iodine value of at least 35.

19. The process according to claim 1, wherein the starting vegetable oil composition has an iodine value of at least 40.

20. The process according to claim 1, wherein the starting vegetable oil composition has an iodine value of at least 45.

21. The process according to claim 1, wherein the starting vegetable oil composition has an iodine value of at least 50.

22. The process according to claim 1, wherein the starting vegetable oil composition has an iodine value of at least 55.

23. The process according to claim 1, wherein the starting vegetable oil composition has an iodine value of at least 60.

* * * * *